United States Patent [19]

Holm

[11] 4,037,659
[45] July 26, 1977

[54] MICELLAR FLOODING PROCESS FOR RECOVERING OIL FROM PETROLEUM RESERVOIRS

[75] Inventor: LeRoy W. Holm, Fullerton, Calif.

[73] Assignee: Union Oil Company of California, Brea, Calif.

[21] Appl. No.: 710,543

[22] Filed: Aug. 2, 1976

[51] Int. Cl.² .............................................. E21B 43/22
[52] U.S. Cl. ...................................... 166/273; 166/270
[58] Field of Search ............... 166/270, 273, 274, 275, 166/305 R

[56] References Cited

U.S. PATENT DOCUMENTS

| | | | |
|---|---|---|---|
| 2,920,041 | 1/1960 | Meadors | 166/274 X |
| 3,455,386 | 7/1969 | Reisberg | 166/275 |
| 3,500,919 | 3/1970 | Holm | 166/273 |
| 3,827,496 | 8/1974 | Schroeder | 166/273 |
| 3,876,002 | 4/1975 | Sarem | 166/274 |
| 3,882,938 | 5/1975 | Bernard | 166/273 X |
| 3,920,074 | 11/1975 | Sarem | 166/274 |

*Primary Examiner*—Stephen J. Novosad
*Assistant Examiner*—George A. Suchfield
*Attorney, Agent, or Firm*—Richard C. Hartman; Dean Sandford; John E. Vanderburgh

[57] ABSTRACT

Oil recovery efficiency of tertiary oil recovery processes using a micellar solution as the displacement fluid is improved by injecting a dilute aqueous solution of an alkali metal silicate into the reservoir subsequent to the micellar solution injection and prior to the drive fluid injection. The alkali metal silicate has a $M_2O/SiO_2$ ratio of between 1 and 4.

14 Claims, No Drawings

MICELLAR FLOODING PROCESS FOR RECOVERING OIL FROM PETROLEUM RESERVOIRS

BACKGROUND OF THE INVENTON

This invention relates to the recovery of oil from subterranean petroleum reservoirs and more particularly to an improved micellar solution flooding process for enhanced petroleum recovery.

It has long been recognized that substantial amounts of oil remain unrecovered in the reservoir at the location of normal primary recovery operations. Hence, various secondary methods of recovering additional quantities of oil have been proposed, such as the well-known technique of waterflooding in which water is injected into the reservoir through an injection well to displace and drive additional oil toward one or more production wells in the reservoir spaced apart from the injection well. Although an additional quantity of oil often can be recovered by waterflooding, the efficiency of the waterflood and the ultimate oil recovery can be further improved by introducing into the reservoir ahead of the flood water a displacement fluid that is miscible with both the petroleum in the reservoir and with the flood water.

Micellar displacement fluids, which can be oleaginous or aqueous based systems, comprise solutions or dispersions of surfactants in concentrations in excess of the critical micelle concentration of the surfactant-fluid system. The micellar solutions are miscible with both water and petroleum and thus, when injected into the reservoir ahead of the waterflood, enhance the displacement of the petroleum toward one or more production wells from which the petroleum is recovered.

It is recognized in connection with the use of micellar solutions that the presence of multivalent ions, such as for example calcium, magnesium, barium, iron and the like have a deleterious effect upon the micellar solution system. If present in the reservoir in sufficient quantities these ions can ultimately effect a breakdown of the micellar solution and the resultant loss of effectiveness of the solution. To reduce the concentration of multivalent cations present in the reservoir it has been suggested in the art to utilize pre-injections or preflushes of fluids designed to wash away or to otherwise tie up the multivalent cations prior to injection of the micellar solution into the reservoir. Thus, for example, a pretreatment with water having a low concentration of multivalent cations can be used to dilute or displace the multivalent cations present in the free reservoir water.

More recently, it has been found that aqueous solutions of alkali metal having a controlled molar ratio of alkali metal oxide to silica are effective as a pretreatment solution to improve the efficiency of oil recovery utilizing micellar displacement fluids.

It has been found, however, for a variety of reasons, including differences in viscosity, that often the silicate pretreatment solution has a tendency to travel through the reservoir at somewhat a greater rate than the micellar solution, thus forming a gap between the preflush solution and the micellar solution that increases as the fluids travel away from the injection well. The gap permits undesired contact between the micellar solution and multivalent ions and accordingly the micellar solution can be adversely affected even though a silicate pretreatment solution has been used.

The present invention overcomes the foregoing deficiency in the prior art by eliminating or reducing the gap between the two solutions.

SUMMARY OF THE INVENTION

Briefly, the present invention resides in a process for recovering oil from subterranean petroleum reservoirs utilizing a micellar solution where the deleterious effects of multivalent cations on the micellar solution are avoided by the injection of an aqueous alkali metal silicate solution into the reservoir subsequent to the injection of micellar solution. In this manner the rate of travel of the alkali metal silicate solution and the micellar solution through the reservoir is more closely coordinated and the function of the silicate solution in eliminating or reducing the adverse effect of multivalent ions on the micellar solution is enhanced.

More specifically, the method of the present invention comprises the recovery of petroleum from a subterranean formation in which there is provided one or more injection wells and one or more production wells spaced therefrom by the successive introduction into the reservoir of (1) a micellar solution in sufficient quantity to form a petroleum displacement bank in the reservoir, (2) an aqueous alkaline alkali metal silicate solution and (3) an aqueous drive fluid for moving the micellar solution and the aqueous silicate solution toward one or more of the production wells from which fluids are recovered. Depending upon reservoir conditions, a preflush of low salt content water or even an aqueous alkali metal silicate solution may precede the injection of the micellar solution.

DESCRIPTION OF THE INVENTION

In accordance with the present invention a slug of a micellar solution is first injected into the reservoir through one or more injection or input wells penetrating the oil-bearing formation. This is followed by the injection of a slug of an aqueous alkaline solution of an alkali metal silicate. These fluids are driven through the reservoir by a subsequently injected aqueous flooding medium which displaces them toward at least one production or output well similarly completed in the reservoir. As the fluids pass through the reservoir, residual petroleum therein is displaced and is moved toward the producing well where the petroleum and fluids are recovered by conventional means. The injection and production wells can be arranged in any convenient pattern designed to achieve maximum contact of the oil-bearing zones by the advancing flood front; such as the conventional "five-spot" pattern wherein a central producing well is surrounded by four somewhat symetrically located injection wells. Another of the conventional flooding patterns that can be employed in the practice of this invention is the "line-drive" pattern in which the injection wells are arranged in a line so that the injected flooding medium advances through the formation to displace oil toward one or more spaced production wells that can also be arranged in a line substantially parallel to the line of injection wells.

The micellar solution utilized in the process of this invention comprises a dispersion or solution of a surface active agent in an oleaginous fluid such as for example crude petroleum, distillate petroleum fractions such as gasoline, naphtha, stove oil, diesel and gas oil; residual products obtained by the distillation of lower boiling fractions from crude petroleum such as bunker fuel oil and other residual products; low value refinery by-products such as catalytic cycle oil, lube oil extract and the like; and liquified hydrocarbons such as propane, butane and LPG. In addition surfactants dissolved or dispersed in water form suitable micellar solutions for use in the present invention. Regardless of its fluid base, the surfactants are present in the oleaginous or aqueous fluid in concentrations in excess of the critical micelle concentration, that is the concentration at which the surfactants form micelles in the surfactant-fluid system.

In preferred practice the micellar solutions comprise mixtures of preferentially oil-soluble surfactants and preferentially water-soluble surfactants in the ratio of between 1 part and about 15 parts of the preferentially oil-soluble surfactant per part of preferentially water-soluble surfactant. The choice of surfactant is not deemed to be critical and good results are achieved utilizing alkyl aryl sulfonates containing a single sulfonic group attached to an alkyl aryl hydrocarbon. The preferentially oil-soluble alkyl aryl monosulfonates are those which in the form of their sodium salts have an average molecular weight of more than about 400. The preferentially water-soluble alkyl aryl monosulfonates include those which in the form of their sodium salts have an average molecular weight of less than about 400.

The oleaginous micellar solution may also include from about 10 to about 50 percent of water, which when mixed with the oleaginous surfactant solution, forms a stable emulsion in which the water droplets are normally less than 0.1 micron in size. Similarly, the aqueous micellar solutions may contain minor proportions of oil in the form of an oil-in-water emulsion. These emulsions, which are also referred to as microemulsions, are generally transparent in appearance and are normally stable.

The oleaginous micellar solutions are miscible with the reservoir oil and have the capability of spontaneously emulsifying water when admixed therewith. Likewise, the aqueous micellar solutions are miscible with the aqueous flooding medium and are capable of spontaneously emulsifying oil when contacted therewith.

As mentioned, however, these micellar solutions, and the microemulsions subsequently formed, are adversely affected by multivalent cations such as calcium, magnesium, barium, iron and the like, which are very common in reservoir formations. Although their effect on the micellar solutions is not completely understood, it is believed that the multivalent cations exchange with the monovalent cations of the surfactant to form insoluble sulfonates thus reducing the surfactant concentration in the micellar solution. Consequently emulsion stability and the emulsifying properties of the micellar solution are reduced. This of course adversely affects the ability of the oleaginous micellar solutions to spontaneously emulsify water when contacted therewith and by the same token reduces the ability of the aqueous micellar solution to spontaneously emulsify reservoir oil when contacted therewith.

The aqueous alkaline alkali metal silicate solutions employed subsequent to the injection of the micellar solution in accordance with the present invention are relatively dilute aqueous alkaline solutions of an alkali metal silicate having an alkali metal oxide ($M_2O$) to silica ($SiO_2$) molar ratio of between about 1 and about 4, preferably between 1.5 and 2.5. Exemplary are the silicates of sodium, potassium, lithium, cesium and rubidium, with sodium and potassium silicates being preferred and sodium silicates being especially preferred.

The crystal form of the soluble silicate is not critical and for example the silicate can be used as the orthosilicates, metasilicate, metasilicate pentahydrate, and sesquisilicate. When necessary the $M_2O/SiO_2$ ratio is readily adjusted by addition of a suitable alkali metal hydroxide to raise the $M_2O$ concentration.

Especially useful in the practice of this invention are alkaline sodium and potassium silicate solutions having an $Na_2O/SiO_2$ or $K_2O/SiO_2$ ratio of between about 1 and 4. For example, solutions containing sodium or potassium orthosilicate, sodium or potassium metasilicate, sodium or potassium metasilicate pentahydrate, and sodium or potassium sesquisilicate, are particularly preferred for use in the present invention. Particularly preferred among the sodium and potassium silicates are those having a sodium oxide/silica ratio of between about 1.5 to 2.5 and more particularly about 2.0.

The aqueous alkaline alkali metal silicate solution is prepared by admixing a soluble alkali metal silicate with water. Depending on the silicate form used, the $M_2O/SiO_2$ ratio may fall outside the range between 1 and 4; normally less than 1 due to a high concentration of silica. This molar ratio is readily adjusted by introducing a sufficient amount of an alkali metal hydroxide, such as sodium hydroxide, so as to adjust the $M_2O/SiO_2$ molar ratio of the solution to the desired level. Preferably the alkali metal of the hydroxide will be the same as the alkali metal of the silicate, although this is not essential.

The aqueous alkaline alkali metal silicate solution is preferably a dilute solution in order to avoid silicate gel formation either in the solution itself before injection or in the reservoir. Good results are achieved when the alkali metal silicate concentration is not more than about 5 weight percent and it is preferred to maintain the alkali metal silicate between about 0.1 weight percent and about 3 weight percent.

In accordance with standard practice, a driving fluid is utilized to move the micellar solution and the silicate solution through the reservoir. Typically the driving fluid will comprise an aqueous flooding medium which may include dissolved salts. In addition the aqueous flooding medium can be made more viscous by the addition of a thickening agent such as sugar, dextrine, carboxymethylcellulose, glycerin, guar gum, amines and mixtures of these agents. Also, the aqueous flooding medium can be rendered more viscous by the addition of small amounts of water-soluble polymer such as for example hydroxyethylcellulose or polyacrylamide. Preferably the thickening agent is added only to an initial portion of the flooding medium so that the flooding medium in contact with the micellar solution and the alkaline silicate solution is of increased viscosity. The subsequently injected portions of the flooding medium may have a lesser viscosity without adversely affecting the efficiency of the process.

In the practice of the process, an effective amount of the micellar solution is injected as a slug into the reservoir, typically through an injection well which penetrates the reservoir. The amount of micellar solution injected into the reservoir typically will range between about 0.01 to about 0.15 of the pore volume of the reservoir pore volume, although greater or lesser amounts of micellar solution may be used depending upon the nature of the reservoir formation, its porosity, the nature of the reservoir petroleum and the like.

As previously mentioned, the oleaginous micellar solution may comprise up to 50 volume percent of water dispersed therein as a microemulsion. The water may be admixed with the micellar solution or may be injected simultaneously or immediately following the oleaginous portion of the micellar solution. Alternatively the oleaginous micellar solution may be injected in successive increments in which each increment of micellar solution is followed by an increment of water or an aqueous micellar solution. Similarly an aqueous micellar solution may be utilized and may include up to 50 percent of an oil. The oil may be admixed in the aqueous micellar solution to form a water external emulsion or may be injected simultaneously or in alternate increments with the aqueous micellar solution.

Following the injection of the micellar solution, the alkaline aqueous alkali metal silicate solution is introduced into the reservoir. Good results are achieved when the silicate solution comprises between about 0.01 to about 0.5 of reservior pore volume. A preferred silicate volume is between about 0.05 and about 0.3 pore volume.

Following the injections of micellar solution and silicate solution, the driving fluid, typically an aqueous flooding medium, is injected to drive the previously injected fluids toward at least one spaced production well. As previously mentioned, it has been found advantageous with an aqueous flooding medium to introduce a thickening agent with the flooding medium to increase its viscosity and thus enhance its driving force in the reservoir. Because of the economics and handling and mixing problems it is highly preferred to admix the thickening agent in only the initial portion of flooding medium injected into the reservoir. Good results are achieved when the thickened flooding medium comprises between about 0.1 to about 0.8 of reservoir pore volume. Thereafter the water or brine is injected without thickening agent.

The mechanism by which the silicate solution acts in the reservoir to improve the oil recovery efficiency of the micellar flooding process is not completely understood. It is believed, however, that when injected subsequent to the micellar solution, the aqueous silicate solution moves through the reservoir at a slightly greater rate than the micellar solution and thus eventually contacts and admixes with the micellar solution in the reservoir so as to travel concurrently therewith and to be present to protect the micellar solution from the deleterious effects of multivalent ions encountered in the reservoir formation. As mentioned, however, the precise mechanism is not understood and the description contained herein is not to be construed as being limited to any particular theory of operation.

The invention is further described by the following examples which are illustrative of a specific mode of practicing the invention and are not intended as limiting the scope of the invention as defined by the appended claims.

EXAMPLES 1 - 3

A series of laboratory tests are conducted to demonstrate the deleterious effect of multivalent cations upon oil recovery and the improvement obtained when conducting a flooding operation in accordance with the present invention. The cores employed in these tests are 1 inch diameter by 6 foot long cylinders packed with a No. 16 sand marketed by the American Graded Sand Co. Each sand pack is saturated with a synthetic brine containing 9.43 weight percent of total dissolved solids including 28,200 ppm of sodium ion, 4,870 ppm of calcium ion and 1,190 ppm of magnesium ion. The pack is then saturated with a 37° API Texas Crude oil and flooded to residual oil saturation with the synthetic brine.

A soluble oil is prepared from an admixture consisting of 46.8 volume percent of the 37° API Texas crude oil, 11.6 volume percent of a mixture of oil-soluble and water-soluble alkyl aryl sulfates marketed by the Sonneborn Division of Witco Chemical Co. under the trademark TRS-12B, 1.6 vol. % of a stabilizer consisting of ethylene glycol monobutyl ether, and 40.0 vol. % of fresh water containing an added 2000 ppm of sodium chloride. TRS 12-B is a mixture of approximately 60 wt. % of mixed preferentially oil-soluble and preferentially water-soluble alkyl aryl sulfonates exhibiting an average molecular weight of about 400–410, about 16 wt. % oil, about 20 wt. % water and about 3 wt. % of inorganic mineral salts. The soluble oil is prepared by admixing the crude oil, the alkyl aryl sulfonates and the stabilizer followed by the addition of the fresh water which is emulsified to form an oil-external microemulsion.

The flooding operation of Example 1 is conducted by injecting 0.034 pore volume of the micellar solution followed by 0.6 pore volume of an aqueous solution of a water-soluble polyacrylamide exhibiting a Brookfield viscosity of 35 cp at 6 rpm. The cores are then flooded with the synthetic bring until no more oil is produced. Oil recovery is recorded as the percentage of the residual oil which is recovered during the flooding operation.

Example 2 is conducted in the same manner as in Example 1 except that following the injection of micellar solution, 0.1 pore volume of a 1 percent solution of sodium silicate in water is injected into the core. The injection of silicate solution is then followed by the aqueous flooding medium as in Example 1. The $Na_2O/SiO_2$ ratio of the aqueous silicate solution is about 0.4 and the pH is about 8.5.

The flooding operation of Example 3 is conducted as in Example 2 except that the sodium silicate has an $Na_2O/SiO_2$ ratio of about 2 and the 1 percent aqueous solution has a pH of about 10.5.

The results of Examples 1–3 are set forth in Table A below:

TABLE A

| Example | Alkaline Silicate Solution, Pore Volume | $M_2O/SiO_2$ | % Oil Recovery |
|---|---|---|---|
| 1 | 0 | — | 54.4 |
| 2 | 0.1 | 0.4 | 46.5 |
| 3 | 0.1 | 2.0 | 93.8 |

From Table A above it can be seen that there is an unexpected improvement in the percent of oil recovered in Example 3 which is conducted in accordance with the present invention as compared with Example 1 where no silicate solution is injected into the core. Additionally, however, it can be also seen that there is unexpected improvement in oil recovery between Example 3, conducted in accordance with the present invention, and Example 2 where a silicate solution is injected after the micellar solution but the silicate solution has an $M_2O/SiO_2$ ratio of less than 1.

While the foregoing examples illustrate one embodiment of the process of the present invention, it should be clear that the process may be modified such as for example by injecting a pretreatment fluid prior to the injection of micellar solution. The pretreatment fluid may be any of those used to preflush reservoirs prior to flooding, such as brine solutions of controlled brine concentration, aqueous non-micellar surfactant solutions and the like. A highly preferred pretreamtent fluid is the aqueous, alkaline alkali metal silicate solution of the type utilized subsequent to the micellar solution. In addition, further modifications will be apparent to those skilled in the art and such modifications are included within the scope of this invention as defined by the following claims.

I claim:

1. In the method for recovering petroleum from a subterranean reservoir in which a micellar solution is injected into the reservoir through an injection well in communication therewith, and thereafter an aqueous flooding medium is injected to drive the micellar solution towards one or more spaced production wells from which fluids are recovered, the improvement which comprises:
   injecting into said reservoir subsequent to the injection of said micellar solution and prior to the injection of said aqueous flooding medium an aqueous alkaline alkali metal silicate solution having a $M_2O/SiO_2$ molar ratio of between about 1 and about 4, wherein M is an alkali metal.

2. The method as defined in claim 1 wherein said aqueous alkaline alkali metal silicate solution has a $M_2O/SiO_2$ molar ratio of between 1.5 and 2.5.

3. The method as defined in claim 1 wherein said aqueous alkaline alkali metal silicate solution comprises up to about 5 weight percent of said alkali metal silicate.

4. The method of claim 1 wherein about 0.01 to 0.5 pore volume of said aqueous alkaline alkali metal silicate solution is injected into said reservoir.

5. The method as defined in claim 1 wherein said alkali metal silicate is sodium silicate.

6. The method as defined in claim 1 wherein said alkali metal silicate is potassium silicate.

7. The process of claim 1 further including the step of injection a pretreatment fluid into said reservoir prior to said micellar solution.

8. The process of claim 7 wherein said pretreatment fluid is an aqueous alkaline alkali metal silicate solution having a $M_2O/SiO_2$ ratio of between about 1 and about 4, wherein M is an alkali metal.

9. A method for recovering petroleum from a subterranean reservoir penetrated by an injection well and at least one production well spaced apart in the reservoir, which comprises:
   injecting 0.01 to 0.15 pore volume of a micellar solution;
   next injecting about 0.01 to 0.5 pore volume of a dilute, alkaline aqueous solution of an alkali metal silicate having a $M_2O/SiO_2$ ratio of between about 1.5 and 2.5, wherein M is sodium, potassium, lithium, cesium or rubidium;
   thereafter injecting an aqueous flooding medium to drive the micellar solution and said aqueous silicate solution toward a spaced production well; and
   recovering petroleum from said production well.

10. The method of claim 9 wherein said soluble silicate is sodium silicate having a $Na_2O/SiO_2$ ratio of about 2.

11. The method of claim 9 herein between about 0.05 and about 0.3 pore volume of said aqueous silicate solution is injected into said reservoir.

12. The method of claim 9 wherein 0.1 pore volume of a aqueous solution of sodium silicate having a $M_2O/SiO_2$ ratio of about 2 in injected into said reservoir.

13. The process of claim 9 wherein said reservoir is pretreated by the injection of a pretreatment fluid prior to said micellar solution.

14. The process of claim 13 wherein said pretreatment fluid is a dilute aqueous solution of an alkali metal silicate having a $M_2O/SiO_2$ ratio of between about 1 and about 4, M being an alkali metal.

* * * * *